Dec. 25, 1945.  L. S. WOOD  2,391,813
POWER TAIL GATE
Filed Aug. 7, 1944  2 Sheets-Sheet 1
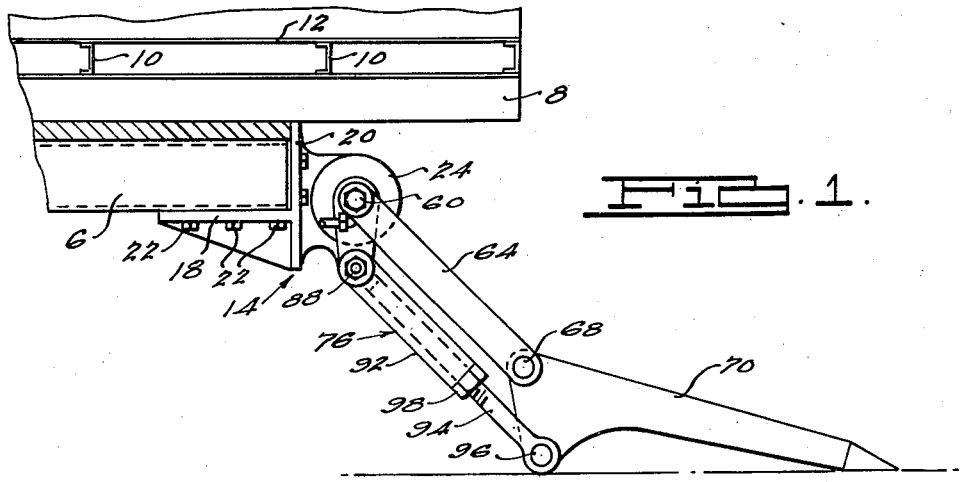
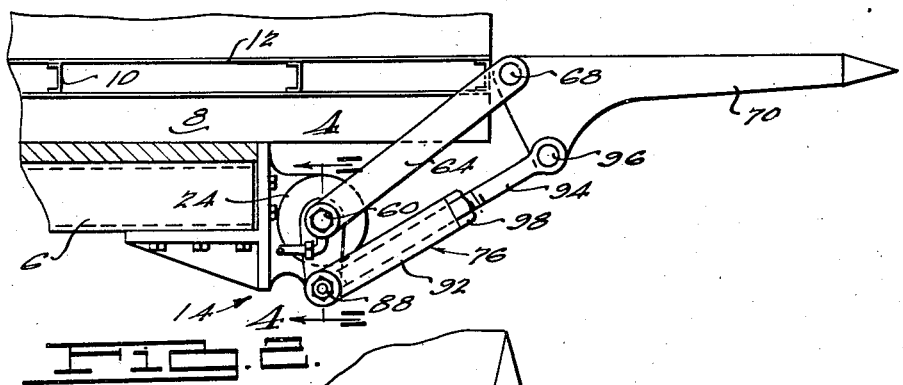
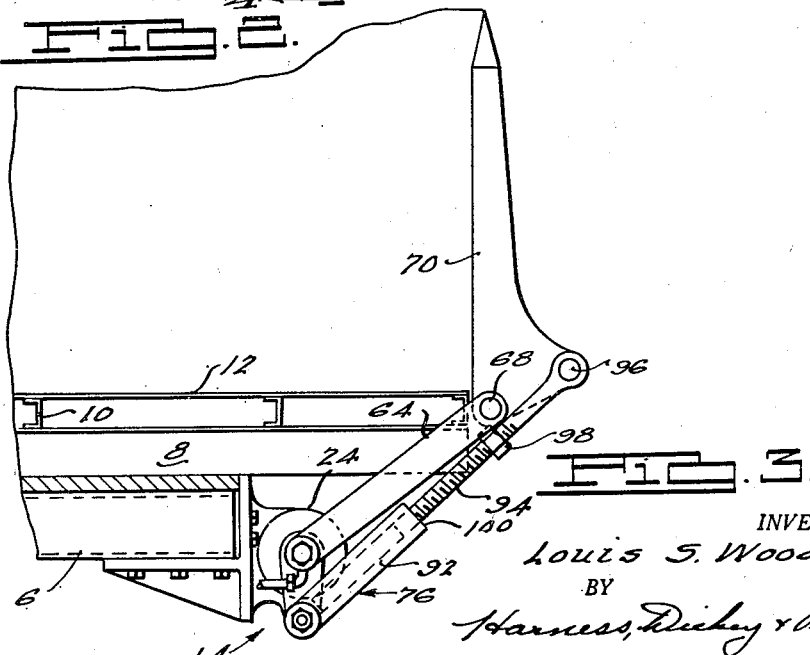
INVENTOR.
Louis S. Wood
BY
Harness, Dickey & Pierce.
ATTORNEYS.

Dec. 25, 1945.  L. S. WOOD  2,391,813
POWER TAIL GATE
Filed Aug. 7, 1944  2 Sheets-Sheet 2
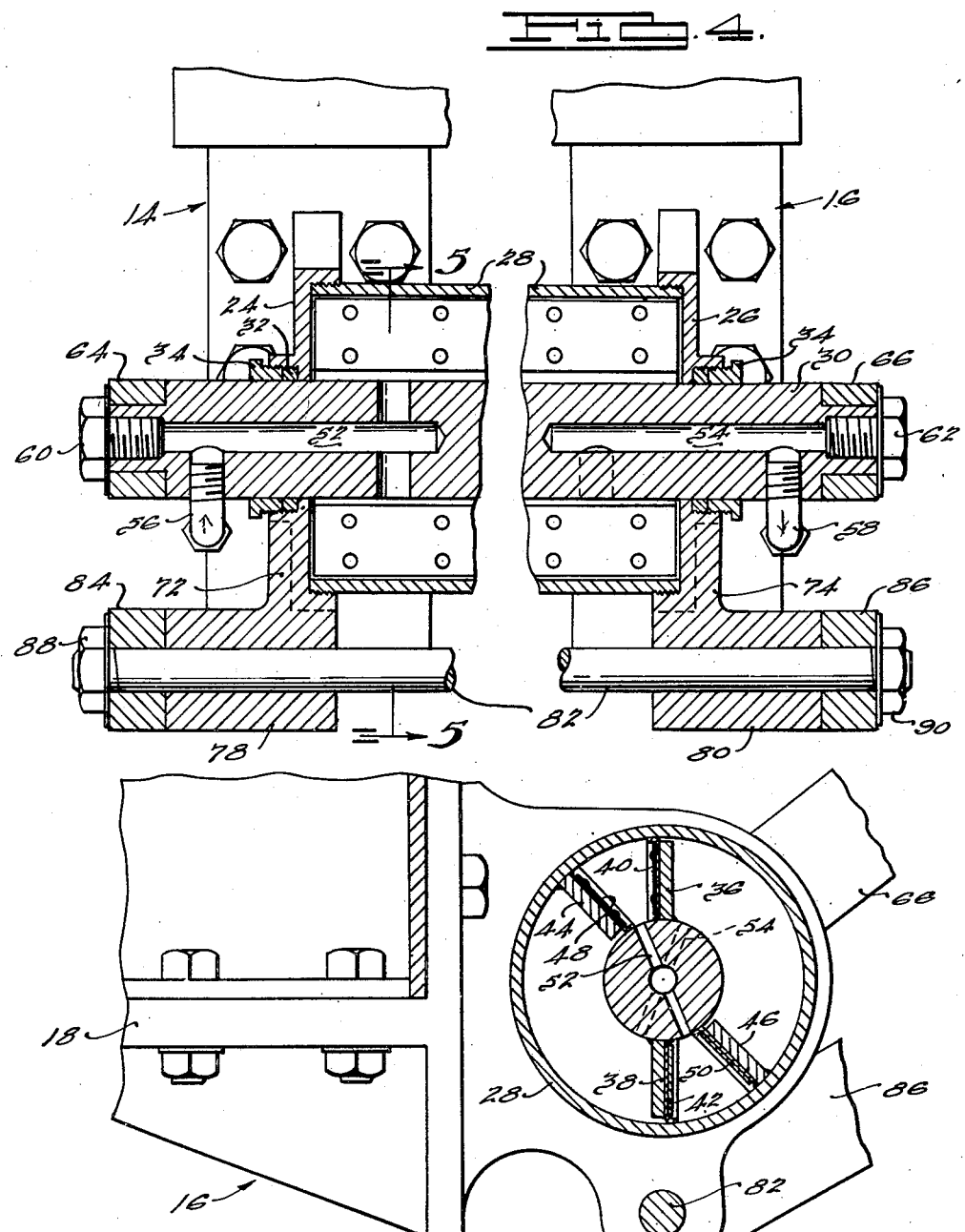
INVENTOR.
Louis S. Wood.
BY
Harness, Dickey & Pierce.
ATTORNEYS.

Patented Dec. 25, 1945

2,391,813

UNITED STATES PATENT OFFICE 2,391,813

POWER TAIL GATE

Louis S. Wood, Grosse Pointe Farms, Mich., assignor to Gar Wood Industries, Inc., Detroit, Mich., a corporation of Michigan Application August 7, 1944, Serial No. 548,471

7 Claims. (Cl. 214—77)

This invention relates to power-operated tail gates for vehicle bodies and the like whereby the tail gate is used to lift cargo from the ground level to the vehicle body level.

The main objects of this invention are to provide an improved power-operated tail gate for a vehicle body which may be easily and readily mounted underneath the rear end of a vehicle body and will occupy a minimum of space; to provide a device of this character which may be hydraulically operated to lift the tail gates from a position resting upon the ground to a position in horizontal prolongation of the upper surface of the vehicle body and thereafter permit the tail gate to be rotated to a vertical position to close the rear end of the vehicle body to provide a hydraulically-operated tail gate with mechanism which has a maximum of simplicity and a minimum number of parts; and to provide an operating mechanism of this character which is compact and unitary in construction and which may be mounted on a truck with a minimum of change or modification of the truck body structure.

An illustrative embodiment of this invention is shown in the accompanying drawings, in which Fig. 1 is a view in side elevation of the hydraulically operated tail gate and operating structure mounted underneath the rear end of a vehicle body with the tail gate in the lower or ground position;

Fig. 2 is a view similar to Fig. 1, but with the tail gate in the raised or upper position where it is in horizontal prolongation of the truck body floor;

Fig. 3 is a view similar to Figs. 1 and 2, but with the tail gate rotated to an upright or vertical position for closing the rear end of the truck body;

Fig. 4 is an enlarged sectional view taken on the line 4—4 of Fig. 2 with the middle part broken away and the two ends brought close together for purposes of clarity; and Fig. 5 is a fragmentary sectional view, taken on the line 5—5 of Fig. 4, looking in the direction indicated by the arrows.

Power-operated tail gates as heretofore made have been subject to some difficulties. Motor trucks as currently manufactured have the bodies so positioned with respect to the ground that very little room is provided between the under side of the body or chassis and the ground. As a consequence, it is difficult to mount any mechanism underneath the rear end of the truck body unless such mechanism is of compact character. This low mounting of truck bodies precludes the use of long levers and links, for the reason that sufficient clearance is not provided. Furthermore, if the operating mechanism for the tail gate is positioned forward of the rear end, it is often difficult to find sufficient room to house it without interfering with the brakes, springs, or other parts of the motor truck mechanism.

In the present construction, the unit is entirely self-contained in a compact manner and may be bolted or otherwise secured to the rear end of the chassis frame underneath the rear end of the truck body, and for the amount of power secured by the particular type of hydraulic hoist mechanism used, the device will occupy a minimum of space and not interfere with any of the usual operating mechanism of the motor truck. The only connections required are hydraulic lines from the control valve situated between the pump and the hydraulic-operating cylinder, and these hydraulic lines may be readily housed along the side of the truck frame leading to the rear end where this hydraulic unit is mounted.

In the construction shown in the drawings, the rear end of a motor truck chassis frame 6 has mounted thereon a vehicle body of the usual character having longitudinal sill members 8 and spaced cross members 10 which support a floor 12.

The hydraulically operated tail gate unit comprises a pair of brackets generally designated 14 and 16, each of which has a forwardly, longitudinally projecting arm portion 18 adapted to be bolted to the lower flange of the adjacent chassis side-member frame 6 and a vertically extending portion 20 adapted to be bolted against the rear end of the chassis frame 6. In the embodiment shown, these brackets are secured by bolts 22, but it will be understood that the brackets could be welded to the chassis frame if desired.

The brackets 14 and 16 have rearwardly extending, circular, shallow, cup-shaped head portions 24 and 26 respectively which are interiorly threaded to receive the opposite ends of a horizontally extending, hydraulic cylinder 28 which is exteriorly threaded to receive the heads. Each of the heads 24 and 26 is provided with a concentrically disposed opening through which protrude the opposite ends of a horizontally disposed shaft 30. Suitable packing and threaded gland nuts 32 and 34 are provided for each of the heads for sealing around the shaft 30 to prevent escape of hydraulic fluid under pressure from within the cylinder 28.

That portion of the shaft 30 which is within the cylinder 28 is provided with diametrically opposed, radially extending piston vanes 36 and 38 welded or otherwise rigidly secured thereto. Suitable packings 40 and 42 are provided for effecting a seal against the inner wall of the hydraulic cylinder as is customary in constructions of this character.

The inner wall of the hydraulic cylinder 28 is also provided with diametrically positioned, radially extending fins or vanes 44 and 46 welded or otherwise rigidly secured thereto which are also provided with suitable packings 48 and 50 which co-operate with the shaft vanes for entrapping hydraulic fluid therebetween.

The shaft 30 is provided with suitably arranged, axially and radially extending bores or ducts 52 and 54 which provide hydraulic fluid passageways connected to flexible, hydraulic leads 56 and 58 respectively. The horizontal portions of the passageways 52 and 54 may be bored inwardly from the outer ends of the shaft and the bores closed by suitably gasketed, threaded studs 60 and 62 respectively. The bore 52 is preferably the high-pressure side for the hydraulic fluid, whereas the bore 54 communicates with the low-pressure side of the hydraulic system so as to conduct the fluid back to the tank which may leak past the pistons.

The opposite ends of the shaft 30 which protrude beyond the cylinder heads 24 and 26 have rigidly and nonrotatably secured thereto, one end each of a pair of lifting arms 64 and 66 which are held thereon by the cap and closure screws 60 and 62 respectively. The opposite ends of each of the arms 64 and 66 are pivotally connected at 68 to a tail gate 70.

Each of the cylinder head brackets 14 and 16 also has a downwardly projecting portion integrally formed thereon as shown at 72 and 74 which serve as fixed pivot points for one of the ends of a pair of connecting links generally designated 76. The lower ends of the depending brackets 72 and 74 terminate in cylindrical heads 78 and 80 respectively which are horizontally bored to receive a tie rod 82. The opposite ends of the tie rod 82 protrude beyond the heads 78 and 80 to receive the ends 84 and 86 of the links 76 and are provided with nuts 88 and 90, respectively, for retaining the links thereon.

The links 76 are of identical construction, so that a detailed explanation and description of one will suffice for both. Each of the links 76 comprises a cylindrical socket portion 92 having axially extending bore therethrough for slidably or telescopically receiving the threaded shank end of a link member 94, the other end of which terminates in an eye which is pivotally secured at 96 to the tail gate 70 in spaced relation to the pivot point 68. The threaded member 94 is provided with a nut 98 which may be adjusted to position or abut against the end 100 of the socket member 92 so as to adjustably position the tail gate 70 as desired, either in a horizontal position when upon the ground, or in a slightly inclined position as shown in Fig. 1 of the drawings.

It is to be noted that the pivot point of the operating arms and links are closer together on the hydraulic hoist bracket mounting than the points 68 and 96 which are the points of attachment of these members to the tail gate 70. With this arrangement, although the tail gate 70 is in an inclined position when at ground level, as shown in Fig. 1, when the tail gate is raised to the body level, it is in a horizontal position, as shown in Fig. 2.

In the operation of this power-operated tail gate, the adjusting nut 98 is rotated to position it on the threaded shank 94 at the desired position so that the tail gate 70 will be either inclined when lying upon the ground, as shown in Fig. 1 of the drawings, or in any other desired position, such as horizontally. When in this position, cargo and freight may be readily loaded upon the tail gate, and this is particularly useful for loading heavy boxes, barrels, crates, machinery, and the like.

After the cargo has been loaded upon the tail gate 70, hydraulic fluid under pressure is introduced through the line 56 into the passageways 52, thence into the hydraulic cylinders between the piston vanes 36 and 38 and the cylinder vanes 44 and 46, respectively.

Fluid under pressure, introduced into the hydraulic cylinder in this manner, rotates the shaft 30 about its axis and thus rotates the lifting arms 64 and 66 about the axis of the shaft 30, thereby swinging their outer ends, which are pivoted to the tail gate 70, upwardly, and, due to the connecting links 76 which serve as compression members or struts, the tail gate 70, by what is generally referred to as a parallel link motion, is lifted upwardly to the position shown in Fig. 2 of the drawings.

When in this position, the cargo or freight, which has been lifted on the tail gate 70, may be readily rolled, shoved, or slid over onto the truck body bottom 12, and, after all the cargo has been loaded onto the truck, the tail gate 70 may be rotated about the pivot point 68 upwardly to a vertical position, as shown in Fig. 3 of the drawings, thereby closing the rear end of the truck body. During such rotation, the threaded member 94 slides outwardly in the socket 92, as shown in Fig. 3 of the drawings, and the tail gate 70 may be locked or latched in the position therein shown.

Any hydraulic fluid within the cylinder 28 which may leak past the vane piston, is vented out through the passageways 54 and line 58 in the usual manner.

It is thus seen that the entire hydraulic operating mechanism comprises a single, compact, unitary and self-contained device, requiring only suitable hydraulic lead lines to be attached to it from the forward part of the truck.

Due to the slightly unequal spacing of the pivot points at the opposite ends of the lifting arms and links, if the tail gate 70 is in a horizontal position when upon the ground, it will be inclined slightly above horizontal when raised to its upper position thereby aiding and assisting in sliding the cargo from the tail gate onto the truck body 12.

Although but one form of the invention has been illustrated and described in detail, it will be apparent to those skilled in the art that various modifications may be made without departing from the scope of the appended claims.

What is claimed is:

1. A power-operated tail gate for a vehicle body, comprising a horizontally disposed, transversely positioned shaft journaled adjacent the rear end of the body, a hydraulic vane-type piston operatively connected to said shaft, a housing surrounding said piston and operatively associated therewith whereby hydraulic fluid supplied to said housing under pressure will rotate said vane and shaft, lifting arms nonrotatably mounted, one on each end of said shaft, a tail gate pivotally connected to said lifting arms, and a pair of links each having one end journaled on a fixed pivot in spaced relation to the axis of said shaft and the other end pivoted to said tail gate in spaced relation to the points of pivotal connection of said lifting arms.

2. A power-operated tail gate for a vehicle body, comprising a horizontally disposed, transversely positioned shaft journaled adjacent the rear end of the body, a hydraulic vane-type piston operatively connected to said shaft, a housing surrounding said piston and operatively associated therewith whereby hydraulic fluid supplied to said housing under pressure will rotate said vane and shaft, lifting arms nonrotatably mounted, one on each end of said shaft, a tail gate pivotally connected to said lifting arms, and a pair of links each having one end journaled on a fixed pivot in spaced relation to the axis of said shaft and the other end pivoted to said tail gate in spaced relation to the points of pivotal connection of said lifting arms, said links being extensible whereby said tail gate may be rotated upwardly about the points of pivotal connection of said lifting arms.

3. A power-operated tail gate for a vehicle body, comprising a horizontally disposed, transversely positioned shaft journaled adjacent the rear end of the body, a hydraulic vane-type piston operatively connected to said shaft, a housing surrounding said piston and operatively associated therewith whereby hydraulic fluid supplied to said housing under pressure will rotate said vane and shaft, lifting arms nonrotatably mounted, one on each end of said shaft, a tail gate pivotally connected to said lifting arms, and a pair of links each having one end journaled on a fixed pivot in spaced relation to the axis of said shaft and the other end pivoted to said tail gate in spaced relation to the points of pivotal connection of said lifting arms, said links being adjustable as to effective length for varying the position of said tail gate.

4. A power-operated tail gate for a vehicle body, comprising a horizontally disposed, transversely positioned hydraulic cylinder rigidly mounted adjacent the lower rear end of the body, a shaft rotatably journaled in said cylinder with its ends protruding therefrom, a vane-type piston on said shaft whereby fluid supplied to said cylinder under pressure will rotate said shaft, a pair of lifting arms, one at each end of said cylinder and each having one end nonrotatably mounted on the adjacent protruding shaft end, a tail gate pivotally attached to the other end of each of said arms, and a pair of links each having one end journaled on a fixed pivot in spaced relation to the axis of said shaft and the other end pivoted to said tail gate in spaced relation to the points of pivotal connection of said lifting arms.

5. A power-operated tail gate for a vehicle body, comprising a horizontally disposed, transversely positioned hydraulic cylinder rigidly mounted adjacent the lower rear end of the body, a shaft rotatably journaled in said cylinder with its ends protruding therefrom, a vane-type piston on said shaft whereby fluid supplied to said cylinder under pressure will rotate said shaft, a pair of lifting arms, one at each end of said cylinder and each having one end nonrotatably mounted on the adjacent protruding shaft end, a tail gate pivotally attached to the other end of each of said arms, and a pair of links each having one end journaled on a fixed pivot in spaced relation to the axis of said shaft and the other end pivoted to said tail gate in spaced relation to the points of pivotal connection of said lifting arms, said links being extensible whereby said tail gate may be rotated upwardly about the points of pivotal connection of said lifting arms.

6. A power-operated tail gate for a vehicle body, comprising a horizontally disposed, transversely positioned hydraulic cylinder rigidly mounted adjacent the lower rear end of the body, a shaft rotatably journaled in said cylinder with its ends protruding therefrom, a vane-type piston on said shaft whereby fluid supplied to said cylinder under pressure will rotate said shaft, a pair of lifting arms, one at each end of said cylinder and each having one end nonrotatably mounted on the adjacent protruding shaft end, a tail gate pivotally attached to the other end of each of said arms, and a pair of links each having one end journaled on a fixed pivot in spaced relation to the axis of said shaft and the other end pivoted to said tail gate in spaced relation to the points of pivotal connection of said lifting arms, said links being adjustable as to effective length for varying the position of said tail gate.

7. A power-operated tail gate for a vehicle body, comprising a horizontally disposed, transversely positioned hydraulic cylinder rigidly mounted adjacent the lower rear end of the body, a shaft rotatably journaled in said cylinder with its ends protruding therefrom, a vane-type piston on said shaft whereby fluid supplied to said cylinder under pressure will rotate said shaft, a pair of lifting arms, one at each end of said cylinder and each having one end nonrotatably mounted on the adjacent protruding shaft end, a tail gate pivotally attached to the other end of each of said arms, and a pair of links each having one end journaled on a fixed pivot in spaced relation to the axis of said shaft and the other end pivoted to said tail gate in spaced relation to the points of pivotal connection of said lifting arms, said links being extensible whereby said tail gate may be rotated upwardly about the points of pivotal connection of said lifting arms and being adjustable as to effective length for varying the position of said tail gate.

LOUIS S. WOOD.